US 9,384,278 B2

(12) United States Patent
Yuan et al.

(10) Patent No.: US 9,384,278 B2
(45) Date of Patent: Jul. 5, 2016

(54) METHODS AND SYSTEMS FOR ASSESSING EXCESSIVE ACCESSORY LISTINGS IN SEARCH RESULTS

(75) Inventors: Ted Tao Yuan, Cupertino, CA (US); Michael Mathieson, Sunnyvale, CA (US); Parashuram Kulkarni, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 921 days.

(21) Appl. No.: 13/082,226

(22) Filed: Apr. 7, 2011

(65) Prior Publication Data

US 2012/0259844 A1    Oct. 11, 2012

(51) Int. Cl.
*G06F 17/30*    (2006.01)

(52) U.S. Cl.
CPC .................. *G06F 17/30864* (2013.01)

(58) Field of Classification Search
CPC .................................. G06F 17/30864
USPC ........................................... 707/723
See application file for complete search history.

(56) References Cited

U.S. PATENT DOCUMENTS

| 5,243,520 | A | * | 9/1993 | Jacobs et al. ................ 704/9 |
| 2004/0064438 | A1 | * | 4/2004 | Kostoff ........................ 707/1 |
| 2010/0153187 | A1 | * | 6/2010 | Ghani et al. ................ 705/10 |
| 2012/0047148 | A1 | * | 2/2012 | Guo et al. .................. 707/748 |

* cited by examiner

*Primary Examiner* — Syling Yen
(74) *Attorney, Agent, or Firm* — Schwegman, Lundberg & Woessner, P.A.

(57) ABSTRACT

A system and method for assessing excessive accessory listings in search results includes a processor-implemented textual mining module that parses a data field of a document and generates at least one token from the data field. A processor-implemented scoring module calculates a score for the at least one token, with the at least one token score representing a likelihood that the at least one token belongs to one of two binary classifications. The processor-implemented scoring module also calculates a score for the document based on the at least one token score, with the document score representing a probability of the document being in one of the two binary classifications. A processor-implemented decision tree module inputs the document score and document attribute values into a decision tree and generates an output representing a refined score based on the document score and at least one of the document attribute values.

25 Claims, 6 Drawing Sheets

METHODS AND SYSTEMS FOR ASSESSING EXCESSIVE ACCESSORY LISTINGS IN SEARCH RESULTS

TECHNICAL FIELD

Example embodiments of the present disclosure generally relate to methods and systems for assessing excessive accessory listings in search results.

BACKGROUND

A common feature of websites that facilitate electronic commerce is the classification and categorization of goods, services, or other assets (collectively, "items") offered for sale. Classification of goods and services requires a balancing act between segmenting items into relevant categories to make the transacting experience efficient and user-friendly and ensuring that the categories remain broad enough that potential buyers and sellers can easily categorize or find items. In certain instances, however, items may be miscategorized, or certain types of items may pollute or overwhelm the listings offered in a category.

BRIEF DESCRIPTION OF THE DRAWINGS

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Although the present disclosure has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense.

In various embodiments, a system, method, and machine-readable storage medium storing a set of instructions for assessing excessive accessory listings in search results are disclosed. A processor-implemented textual mining module may parse a data field of a document and generate at least one token from the data field. A token may represent one or more words, symbols, or numbers extracted from the data field. A processor-implemented scoring module may calculate a score for the at least one token, with the at least one token score representing a likelihood that the at least one token belongs to one of two binary classifications. The processor-implemented scoring module also may calculate a score for the document based on the at least one token score, with the document score representing a probability of the document being in one of the two binary classifications. A processor-implemented decision tree module may input the document score and document attribute values into a decision tree and generate an output representing a refined score based on the document score and at least one of the document attribute values.

Figure 1:
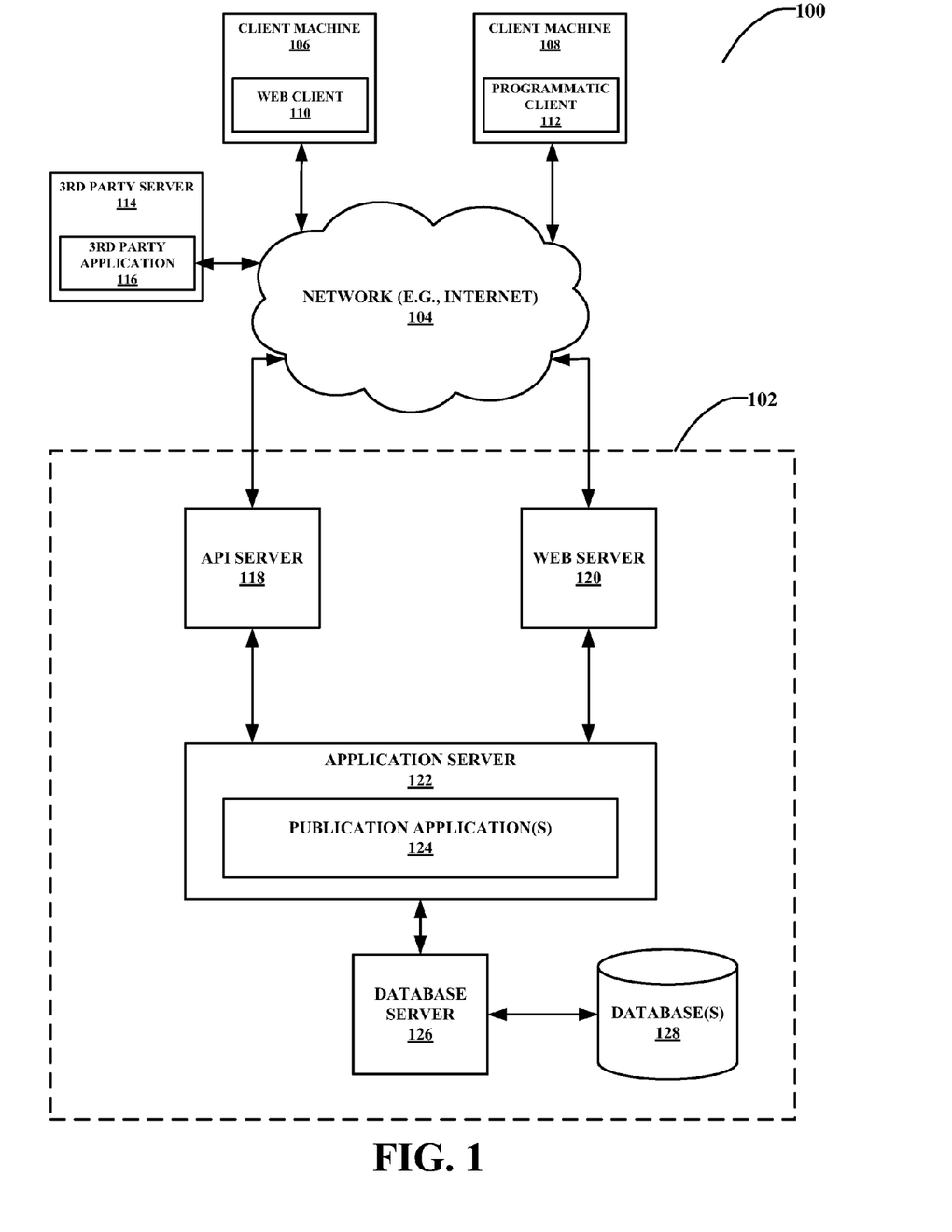
FIG. 1 is a network diagram depicting a network system, according to example embodiments, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., selling and purchasing of items) and aspects (e.g., data describing items listed on the publication/publisher system) associated with the network system 100 and its users. Although illustrated herein as a client-server architecture as an example, other example embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

The publication application(s) 124 may provide a number of publisher functions and services (e.g., search, listing, payment, etc.) to users that access the network-based publisher 102. For example, the publication application(s) 124 may provide a number of services and functions to users for listing goods and/or services for sale, searching for goods and services, facilitating transactions, and reviewing and providing feedback about transactions and associated users. Additionally, the publication application(s) 124 may track and store data and metadata relating to listings, transactions, and user interactions with the network-based publisher 102.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

Figure 2A:
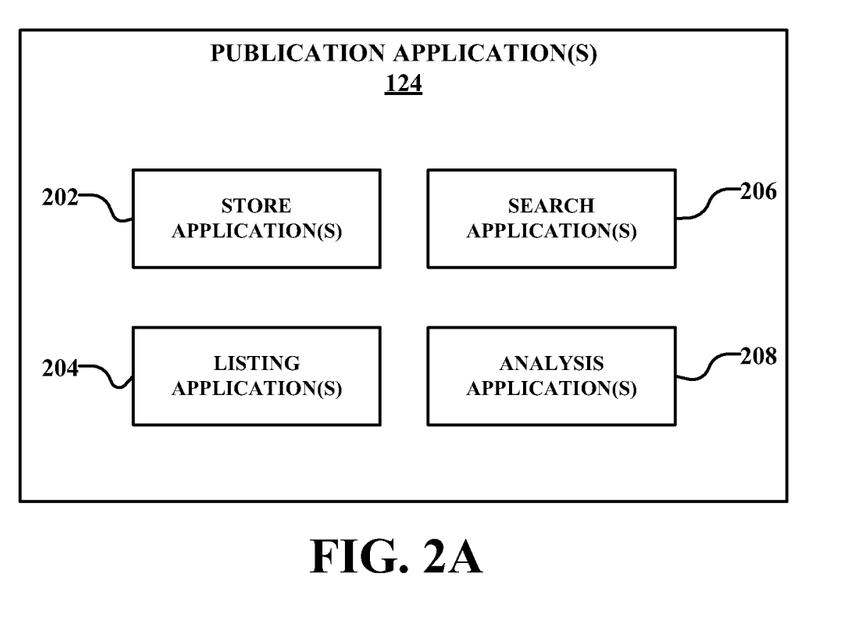
FIG. 2A is a block diagram illustrating multiple publication applications, which may be provided as part of a network-based publisher, in accordance with example embodiments.

FIG. 2A is a block diagram illustrating an example embodiment of multiple publication application(s) 124, which are provided as part of the network-based publisher 102. The network-based publisher 102 may provide a multitude of listing and price-setting mechanisms whereby a user may be a seller or buyer who lists or buys goods and/or services (e.g., for sale) published on the network-based publisher 102. The network-based publisher 102 also may provide search mechanisms by which a buyer or a seller may submit queries to search among existing listings.

The publication application(s) 124 are shown to include, among other things, one or more application(s) which support the network-based publisher 102, and more specifically, the listing of goods and/or services for sale, the searching of existing listings, and the analysis of existing listings.

Store application(s) 202 permit sellers to list individual goods and/or services (hereinafter generically referred to as "items") for sale via the network-based publisher or group their listings within a "virtual" store, which may be branded and otherwise personalized by and for the sellers. Individual and grouped listings may include details such as a title of an item offered for sale, a description of the item, a price of the item, one or more images of the item, a geographic location of the seller or the item, payment and shipping options, and a return policy. The virtual store also may offer promotions, incentives and features that are specific and personalized to a relevant seller.

Listing application(s) 204 provide mechanisms to enable sellers to list individual items for sale via the network-based publisher. Listing application(s) 204 may operate in cooperation with store application(s) 202 to facilitate the listing of items. Listing application(s) 204 may provide listing templates that guide a seller through a step-by-step process for listing an item for sale. In some example embodiments, listing application(s) 204 include additional functionality for streamlining or simplifying the listing process. In some example embodiments, listing application(s) may include mobile device applications that enable a user to scan a barcode of an item to populate a listing template used to generate a listing of an item to be sold. Mobile device applications also may enable a user to capture an image of an item to initiate a listing generation process.

Search application(s) 206 may provide search user interfaces and functionality to enable users to identify listings matching submitted search queries. The search interfaces may support a multitude of search methodologies, such as keyword searches, category searches, item identifier searches, user searches, title searches, and so forth. In response to a search query, the search application(s) 206 may identify items responsive to the terms included in the query. In some example embodiments, the search application(s) 206 may rank or sort the returned search results according to a hierarchy. For example, search results may be ranked by relevancy, best match, newest to oldest, price, and so forth.

Analysis application(s) 208 may include functionality to enable the network-based publisher 102 to analyze existing item listings. The analysis may be performed to optimize the performance of the network-based publisher 102, such as by improving the classification of item listings or by improving the performance of search query processing, as well as to provide metrics and statistics to buyers and sellers interacting with the network-based publisher 102. For example, analysis application(s) 208 may analyze item listings to determine whether items are properly classified in categories. In some embodiments, the analysis application(s) 208 may analyze listings to determine whether a listing concerns a product or an accessory. In some embodiments, the analysis application(s) 208 may analyze listings to determine whether an item listing is categorized in the correct category. In an example embodiment, the analysis application(s) 208 also may analyze search queries submitted by users to identify a search intent of a user. In some embodiments, the search intent of a user may be inferred by identifying categories of item listings that are responsive to the search query and determining which of the identified categories are dominant categories. Dominant categories (e.g., most visited categories, categories containing the most converted listings, that is, categories which, when returned, resulted in a purchase or sale of an item) may be more likely to include item listings that satisfy or represent the search intent of the user.

Figure 2B:
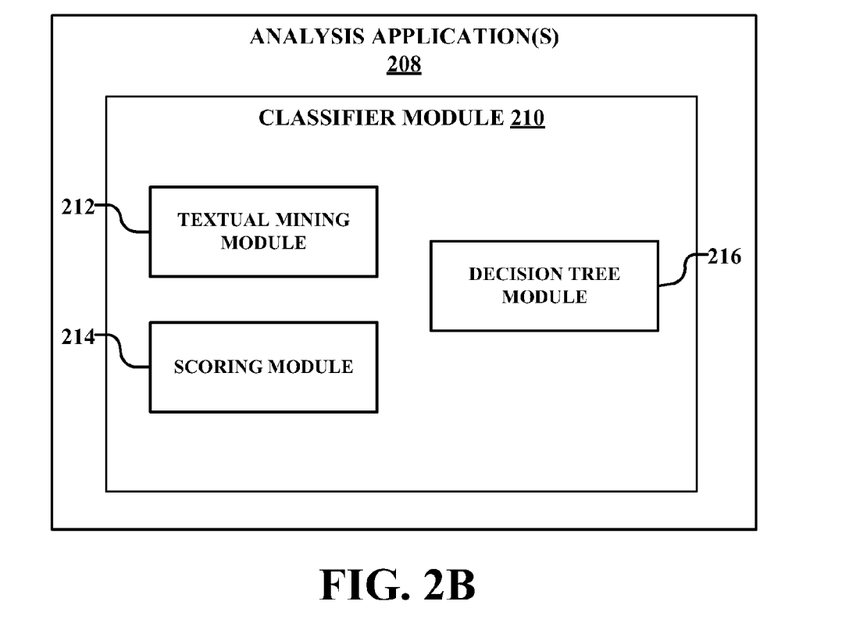
FIG. 2B is a block diagram illustrating various modules of an analysis application, in accordance with example embodiments.

FIG. 2B is a block diagram illustrating an example embodiment of a classifier module 210 which, in some embodiments, may include a textual mining module 212, a scoring module 214, and a decision tree module 216. The classifier module 210 or any of its sub-modules may be used by any of the modules, systems, and methods disclosed herein to analyze item listings and enhance the processing of search queries. The modules disclosed herein may be implemented or executed by one or more processors, or may configure one or more processors to perform the functionality of the modules disclosed herein.

A textual mining module 212 may parse fields of an item listing to identify a type or category of a product. In some embodiments, the textual mining module 212 determines whether an item listing is more likely a product or a product accessory. In other embodiments, the textual mining module 212 may parse the fields of a document generally to perform a binary classification of the document. For example, the textual mining module 212 may be used to parse one or more fields of a document to determine whether an email is or is not spam, that is, unwanted and/or unsolicited email. In some embodiments, the textual mining module 212 parses the words of a title field of an item listing into tokens. By tokenizing the title field of an item listing, the textual mining module 212 may enable analysis of the item listing to be performed by analyzing each word of one or more fields of the item listing.

A scoring module 214 may generate a score for each item listing based on the tokens generated by the textual mining module 212. The scoring module 214 may assign a score to each tokenized word that indicates whether the word is more likely to be in a first binary classification or a second binary classification. For example, in the context of a product or product accessory determination, the scoring module 214 assigns a score to each tokenized word that reflects whether the word is more likely to be a word associated with a product or a product accessory. In some embodiments, the score assigned to each word may be a positive or negative score. In other embodiments, the score may be a '1' or a '0' or other binary scoring system (e.g., "Yes" or "No", "Product" or "Not Product") with one value indicating that the word is more likely associated with a product and the other value indicating that the word is more likely associated with a product accessory.

The scoring module 214 may use or implement a naive Bayes classifier when generating a score for an item listing. The naive Bayes classifier may be applied to calculate the probability that a document falls exclusively within a first or a second binary classification (e.g., a product or a product accessory). For example, the probability that a document (D) may be a product accessory (S) may be represented as p(S|D), while the probability that a document (D) may be a product (i.e., not a product accessory or –S) may be represented as p(–S|D). For each word, the naive Bayes classifier may represent the probability of the word (W) being within the accessories class as p($w_i$|S). The naive Bayes classifier may use the equation below to determine a likelihood or probability ratio of a document being an accessory to a document not being an accessory.

$$lu \frac{p(S|D)}{p(-S|D)} = lu \frac{p(S)}{p(-S)} + \sum_i lu \frac{p(w_i|S)}{p(w_i|-S)}$$

From this equation, a document may be classified as a product accessory if the probability of the document being a product accessory is greater than the probability of the document not being a product accessory, or p(S|D)>p(–S|D).

In some embodiments, a test set of documents is analyzed to teach a machine learning algorithm how to classify documents as being related to either product accessories or products. The textual mining module 212 tokenizes each word in the title field of each document, and the scoring module 214 performs a scoring of the word using the naive Bayes classifier. For each word occurrence, the number of accessory versus non-accessory determinations is calculated to form a ratio of product accessory determinations to product determinations for each word. For example, if the word "charger" appears multiple times in item listings, it may be determined that in x instances, the word "charger" refers to a product accessory, while in y instances, the word "charger" refers to a product itself. The ratio of x to y may be calculated to determine on how likely the word "charger" generally refers to a product accessory.

In an example embodiment, using the equations above as applied to the tokenized words from a sample set of documents, a ratio of the probability of a document being a product accessory to the probability of a document not being a product accessory may be determined. In one embodiment, the ratio R may be determined to be approximately 2.3, meaning that for a document or item listing to be classified as a product accessory, the words in the title need to have positive ratios and the ratio should exceed approximately 2.3. In other embodiments, the ratio R may be dependent on the sets of documents used to train the machine learning system for classification purposes.

The scoring module 214 may combine the scores for individual words in the item listing fields to generate an item score. Each individual tokenized word may be given a score based on the probability calculated by the naive Bayes classifier or based on the ratio R described above. The score may be normalized to within a range of '0' or '1'. For example, if a word has 8594 occurrences in an accessory and 5600 occurrences in a product, the score assigned to the word may be 0.605467 (e.g., 8594 accessory occurrences divided by 14194 samples (the total number of occurrences)). In some embodiments, the scoring module 214 may normalize this score to 0.6, while in other embodiments, the scoring module 214 may normalize this score to 1 to indicate its propensity to be associated with product accessories. A document or item listing's score may be calculated by summing the scores for each tokenized word and dividing by the total number of words.

A decision tree module 216 may enhance the score of a document generated by the scoring module 214. Because the document is scored by the scoring module 214 solely on the words of a field (e.g., the title) of a document, its accuracy may be improved upon. The decision tree module 216 combines the score generated by the scoring module 214 with various document attributes to generate a refined score for each document. For embodiments relating to electronic commerce, where documents are item listings offering items for sale, the document attributes that may be used include, but are not limited to, a starting price of an item, shipping methods and prices, product sales ranks, insurance options, a feedback score of a seller, a country in which the item is located, an item sub-title, payment types, a quantity of the item, a return policy for the item, historical traffic and demand information, and a median price calculated to predict at what the item should be priced. The decision tree module 216 may input some or all of these attributes along with the score generated by the scoring module 214 into a decision tree that outputs results in one or more decision trees using a combination of the score generated by the scoring module 214 and any or all of the attributes discussed above. The results of the decision tree reflect a final score or decision given to the item as to whether the item is considered to be a product accessory or product. In some embodiments, a bit or indicator reflecting an output of the decision tree may be stored with each item listing. The bit or indicator may denote whether the item listing is a product or a product accessory.

Figure 2C:
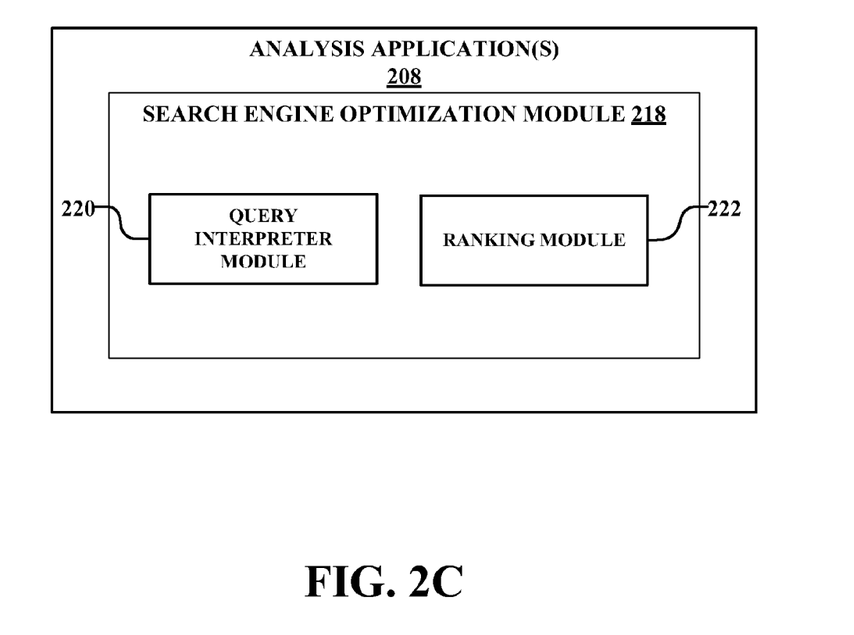
FIG. 2C is a block diagram illustrating modules of an analysis application, in accordance with example embodiments.

FIG. 2C is a block diagram illustrating an example embodiment of a search engine optimization module 218 which, in some embodiments, may include a query interpreter module 220 and a ranking module 222. The search engine optimization module 218 may be used by any of the modules, systems, and methods disclosed herein to analyze item listings and enhance the processing of search queries. The modules disclosed herein may be implemented or executed by one or more processors, or may configure one or more processors to perform the functionality of the modules disclosed herein.

In some embodiments, the query interpreter module 220 receives a search query from the search application(s) 206. In some embodiments, the search query may be a query submitted by a user for an item offered for sale via the network-based publisher 102. The query interpreter module 220 may parse the search query and identify one or more dominant categories related to the search query. In some embodiments, the query interpreter module 220 may identify one or more most visited categories related to the search query or one or more most converted listing categories (i.e., categories which, when returned, resulted in a purchase or sale of an item) related to the search query. Identification of the most relevant categories may be aided by reference to historical data associated with each category. For example, historical data may show that a category overwhelmingly stores product accessories associated with the keywords included in the search query. In this case, the category may be deemed to be a product accessory category. By identifying the dominant categories relating to the search query, the query interpreter module 220 may be able to determine an intent of the query, namely in one example embodiment, whether the query is seeking a product or a product accessory.

The ranking module 222 receives the query intent determination from the query interpreter module 220 and retrieves search results from one or more databases that satisfy the query intent determination. For example, if the query interpreter module 220 determines that a search query seeks a product accessory, the ranking module 222 may receive this determination and may retrieve stored product accessory listings from the categories identified as relevant by the query interpreter module 220. The item listings may be retrieved by performing a keyword search of the one or more databases storing item listings using the words included in the search query. In some embodiments, items stored in the database(s) may be determined to be products or product accessories based on a bit or indicator included in the item listing record that represents whether the item listing is a product or a product accessory. In some embodiments, the categories and sub-categories of item listings may be separated into product and product accessory categories to facilitate efficient retrieval of products or product accessories. In some embodiments, as the item listings are retrieved from the database(s), the ranking module 222 may rank or order the retrieved item listings for presentation to the user.

In some embodiments, item listings may be ranked by the score generated by the scoring module 214 and decision tree module 216. For example, for a search returning item listings that are product accessories, item listings that are scored with greater probability of being a product accessory in a given category may be presented with a higher order or rank than item listings having a lower probability of being a product accessory. In some embodiments, item listings may be ranked or ordered by other metrics or attributes, such as price, seller reputation, time remaining (if the item listing pertains to an auction), and so forth.

Figure 3:
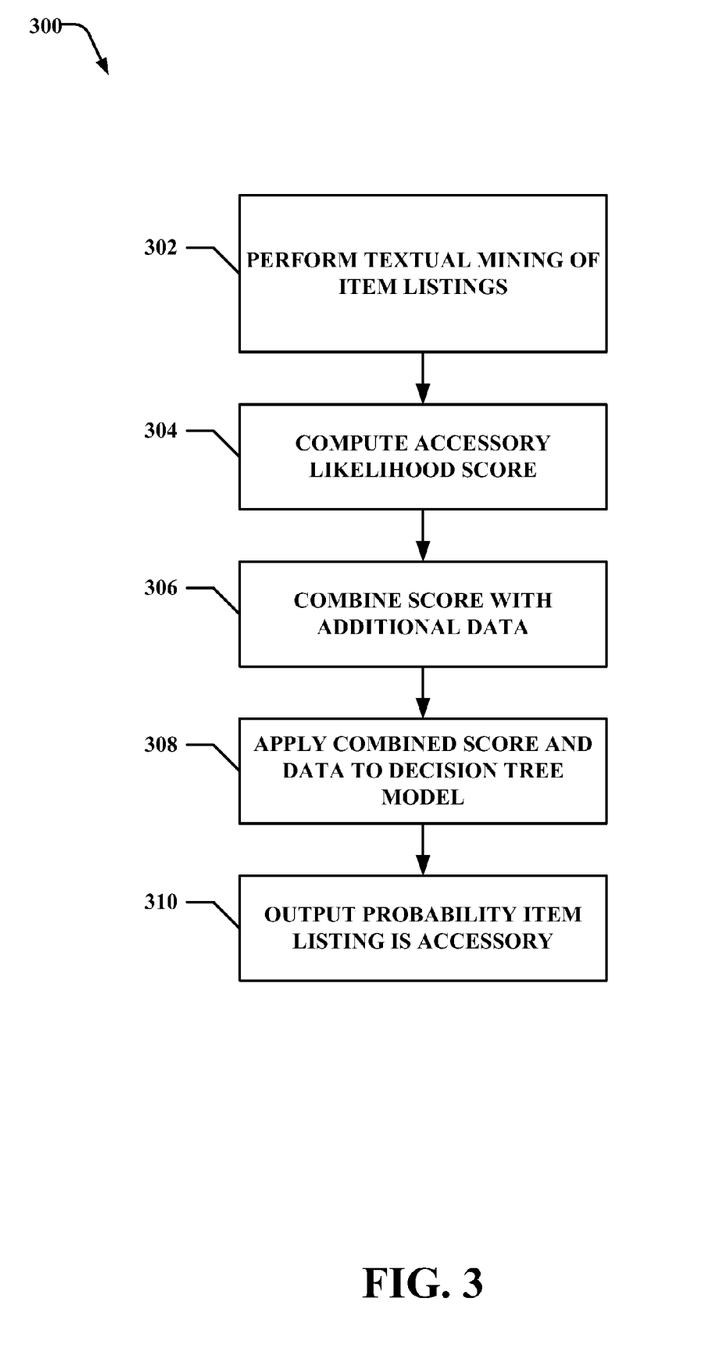
FIG. 3 is a flow chart illustrating an example method for classifying items.

FIG. 3 is a flow chart illustrating an example method for classifying items. At operation 302, one or more data fields of documents or item listings are mined. Data mining operations may include parsing the field(s) and tokenizing the words contained in the fields. At operation 304, a naive Bayes classifier may be employed by a scoring module 214 to classify documents or item listings as falling within one of two binary classifications. In some embodiments, the naive Bayes classifier may classify documents or item listings as either product accessories or products. Classification of documents or item listings is accomplished by generating a score for each tokenized word from the field(s) of the document or item listing being analyzed. The score may be generated from a sample set of item listings used to train a machine learning algorithm to classify item listings. For each word in an item listing field (e.g., title), the number of occurrences of that word in an accessory item listing is compared to the number of occurrences of that word in a product item listing. The occurrences are tallied and a ratio of number of accessory occurrences to number of product occurrences for the word is calculated. The ratio may be used to determine the probability or likelihood that the word is indicative of a product or a product accessory. The ratio also may be converted into a word score, which in some embodiments, may involve normalizing the ratio within a range of 0 to 1.

The scores for the words in each item listing field (e.g., title) may be combined by summing the scores for the words and dividing by the number of total samples. For example, each score may be a normalized ratio of the number of accessory occurrences to the number of product occurrences, with each occurrence being considered a sample. The score may reflect a likelihood or probability that the item listing is a product accessory or a product. For example, the closer the normalized score is to 1, the more likely the item listing is a product accessory.

At operation 306, the score generated for the item listing may be combined with additional item attributes or factors. At operation 308, the score and additional attributes may be input into a decision tree that may use the inputs to generate a refined score for an item listing. The score may be refined through the use of the additional metrics, since the generation of the score in operation 304 may rely only on the text contained in the field(s) (e.g., title) of the item listing. Additional metrics that may further enhance the score of the item listing may include the price of the item, the shipping cost of the item, the return policy of the item, the product sales rank, the available quantity of the item, the location of the item, and various seller-related information (e.g., seller reputation, seller volume).

At operation 310, the decision tree may output a refined score that provides a more comprehensive determination of the likelihood that an item listing is either a product accessory or a product. In some embodiments, the score or the classification derived from the score may be stored with the item listing to inform other components of the system (e.g., the search engine, classification modules) that the item listing is related to a product or a product accessory.

Figure 4:
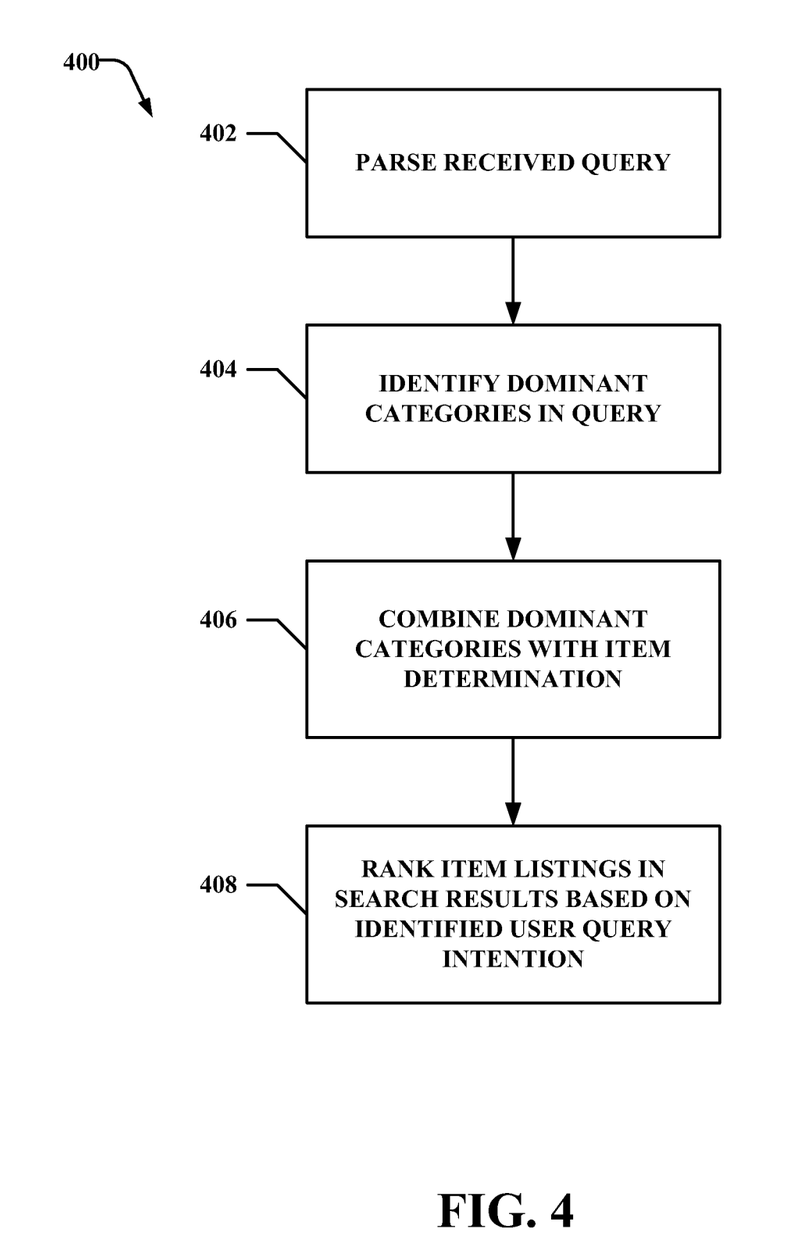
FIG. 4 is a flow chart illustrating an example method for ranking search results based on an intention of a user query.

FIG. 4 is a flow chart illustrating an example method for ranking search results based on an intention of a user query. At operation 402, a search query received from a user may be parsed. In some embodiments, the words comprising the search query may be tokenized for use in processing the search query. At operation 404, using the words of the search query, dominant categories may be identified. Dominant categories may represent categories of item listings that are highly relevant to the submitted search queries. For example, dominant categories may be identified by searching stored categories with keywords derived from the search query. Categories that return a large number of results may be considered dominant categories. In addition to or instead of dominant categories, most visited categories or most converted listing categories (i.e., categories that yielded a conversion, such as a sale, from a search) may be returned.

At operation 406, the returned categories may be combined with item listing determinations within the returned categories. In some embodiments, item listings contained within the returned categories may be grouped or organized into two classes corresponding to the classes used to separate item listings into binary classifications (e.g., products and product accessories). Using the keywords contained in the search query, it may be determined which binary classification the user is searching for item listings. For example, if the user's query includes any of the words "charger," "for," "case," or "cover," a machine learning classifier may determine that the user is searching for a product accessory. In this case, item listings of the returned categories that are grouped in the product accessory category may be returned.

At operation 408, the returned item listings may be ranked or ordered for presentation to the user. By analyzing the words of the search query, search results of a relevant category and classification may be returned to the user. The ordering or ranking of the search results may be based on a multitude of factors, including the score assigned by the classifier and decision tree, the price of the item, the amount of time remaining to purchase the item, and so forth.

Figure 5:
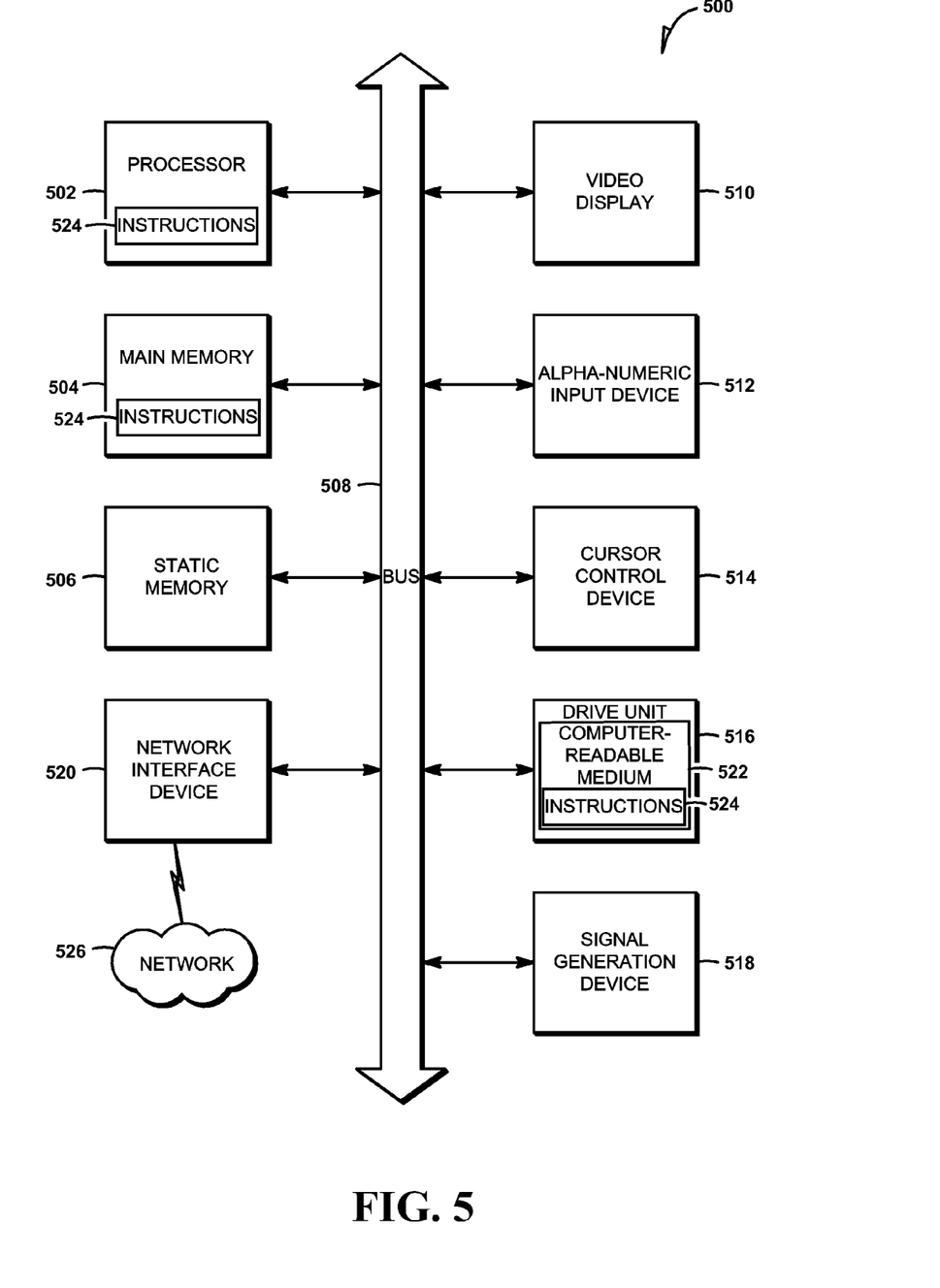
FIG. 5 shows a diagrammatic representation of machine in the example form of a computer system within which a set of instructions may be executed to cause the machine to perform any one or more of the methodologies discussed herein.

FIG. 5 shows a diagrammatic representation of a machine in the example form of a computer system 500 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 220 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 500) or one or more hardware modules of a computer system (e.g., a processor 502 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 502 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 502 configured using software, the processor 502 may be configured as respective different hardware modules at different times. Software may accordingly configure a processor 502, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 502 that are temporarily configured (e.g., by software, code, and/or instructions stored in a machine-readable medium) or permanently configured to perform the relevant operations. Whether temporarily or permanently configured, such processors 502 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 502 or processor-implemented (or computer-implemented) modules. Similarly, at least some of the operations of a method may be governed by instructions that are stored in a computer readable storage medium and executed by one or more processors 502 or processor-implemented (or computer-implemented) modules. The performance of certain of the operations may be distributed among the one or more processors 502, not only residing within a single machine, but deployed across a number of machines. In some example embodiments, the processors 502 may be located in a single location (e.g., within a home environment, an office environment or as a server farm), while in other embodiments the processors 502 may be distributed across a number of locations.

While the embodiment(s) is (are) described with reference to various implementations and exploitations, it will be understood that these embodiments are illustrative and that the scope of the embodiment(s) is not limited to them. In general, techniques for the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   a processor-implemented textual mining module configured to parse a data field of a document and generate at least one token from the data field;
   a processor-implemented scoring module configured to:
      calculate a score for the at least one token, the at least one token score representing a likelihood that the at least one token belongs to one of two binary classifications; and
      calculate a score for the document based on the at least one token score, the document score representing a probability of the document being in one of the two binary classifications; and
   a processor-implemented decision tree module configured to generate an output representing a refined score for the document based on the document score and at least one document attribute value.

2. The system of claim 1, wherein the processor-implemented scoring module uses a naive Bayes classifier to calculate the scores of the at least one token.

3. The system of claim 1, wherein the document is an item listing of an item offered for sale, and wherein the two binary classifications are products and product accessories.

4. The system of claim 1, wherein the processor-implemented scoring module is configured to calculate the at least one token score by determining a first number of occurrences of the at least one token in a first binary classification in a set of item listings and a second number of occurrences of the at least one token in a second binary classification in the set of item listings and by obtaining a ratio of the first number of occurrences to a sum of the first number of occurrences and the second number of occurrences.

5. The system of claim 4, wherein the processor-implemented scoring module is further configured to calculate the at least one token score by normalizing the ratio to derive the at least one token score.

6. The system of claim 4, wherein the processor-implemented scoring module is configured to calculate the document score by adding together the first number of occurrences for the at least one token and dividing the added first number of occurrences for the at least one token by the sum of the first number of occurrences and the second number of occurrences.

7. The system of claim 3, wherein the at least one document attribute value includes at least one of quantity of the item, price of the item, median price of the item, product sales rank, shipping cost, return policy, seller feedback score, and item location.

8. A computer-implemented method, comprising:
   parsing, by at least one processor, a data field of a document and generating at least one token from the data field;
   calculating, by the at least one processor, a score for the at least one token, the at least one token score representing a likelihood that the at least one token belongs to one of two binary classifications;
   calculating, by the at least one processor, a score for the document based on the at least one token score, the document score representing a probability of the document being in one of the two binary classifications;
   inputting the document score and document attribute values into a decision tree; and generating an output using the decision tree, the output representing a refined score for the document based on the document score and at least one of the document attribute values.

9. The computer-implemented method of claim 8, wherein the calculating of the at least one token score uses a naive Bayes classifier.

10. The computer-implemented method of claim 8, wherein the document is an item listing of an item offered for sale, and wherein the two binary classifications are products and product accessories.

11. The computer-implemented method of claim 8, wherein the calculating of the at least one token score comprises:
determining a first number of occurrences of the at least one token in a first binary classification in a set of item listings and a second number of occurrences of the at least one token in a second binary classification in the set of item listings; and calculating a ratio of the first number of occurrences to a sum of the first number of occurrences and the second number of occurrences.

12. The computer-implemented method of claim 11, wherein the calculating of the at least one token score further comprises normalizing the ratio to derive the at least one token score.

13. The computer-implemented method of claim 11, wherein the calculating of the document score comprises:
adding together the first number of occurrences for the at least one token; and
dividing the added first number of occurrences for the at least one token by the sum of the first number of occurrences and the second number of occurrences.

14. The computer-implemented method of claim 8, wherein the document attribute values include at least one of quantity of the item, price of the item, median price of the item, product sales rank, shipping cost, return policy, seller feedback score, and item location.

15. A non-transitory machine-readable storage medium storing a set of instructions that, when executed by at least one processor, causes the at least one processor to perform operations comprising:
parsing a data field of a document and generating at least one token from the data field;
calculating a score for the at least one token, the at least one token score representing a likelihood that the at least one token belongs to one of two binary classifications;
calculating a score for the document based on the at least one token score, the document score representing a probability of the document being in one of the two binary classifications;
inputting the document score and document attribute values into a decision tree; and
generating an output using the decision tree, the output representing a refined score for the document based on the document score and at least one of the document attribute values.

16. The machine-readable storage medium of claim 15, wherein the calculating of the at least one token score uses a naive Bayes classifier.

17. The machine-readable storage medium of claim 15, wherein the document is an item listing of an item offered for sale, and wherein the two binary classifications are products and product accessories.

18. The machine-readable storage medium of claim 15, wherein the calculating of the at least one token score comprises:
determining a first number of occurrences of the at least one token in a first binary classification in a set of item listings and a second number of occurrences of the at least one token in a second binary classification in the set of item listings; and calculating a ratio of the first number of occurrences to a sum of the first number of occurrences and the second number of occurrences.

19. The machine-readable storage medium of claim 18, wherein the calculating of the at least one token score further comprises normalizing the ratio to derive the at least one token score.

20. The machine-readable storage medium of claim 18, wherein the calculating of the document score comprises:
adding together the first number of occurrences for the at least one token; and
dividing the added first number of occurrences for the at least one token by the sum of the first number of occurrences and the second number of occurrences.

21. The machine-readable storage medium of claim 15, wherein the document attribute values include at least one of quantity of the item, price of the item, median price of the item, product sales rank, shipping cost, return policy, seller feedback score, and item location.

22. A computer-implemented method, comprising:
parsing, by at least one processor, a search query received from a user to identify keywords;
identifying at least one dominant category using the keywords, the at least one dominant category including documents containing the keywords;
determining an intent of the search query using the keywords, the intent related to a class of documents to be returned from two binary classifications of documents;
grouping the documents in the at least one dominant category into the two binary classifications, the grouping based on a score calculated for each document in the at least one dominant category, the score representing a probability that the document belongs in one of the two binary classifications;
providing a subset of the documents to the user, the subset of the documents being the documents grouped in one of the two binary classifications, the one of the binary classifications identified based on the intent of the search query; and
ordering the subset of the documents according to at least one of the document scores and a document attribute.

23. The computer-implemented method of claim 22, wherein the score is calculated for the each document in the at least one dominant category using a naive Bayes classifier.

24. The computer-implemented method of claim 22, wherein the score for the each document in the at least one dominant category is calculated by:
determining a first number of occurrences in a first binary classification in a set of documents of at least one word in a field of the document and a second number of occurrences in a second binary classification in the set of documents of the at least one word in the document field;
calculating a ratio of the first number of occurrences to a sum of the first number of occurrences and the second number of occurrences;
normalizing the ratio to derive a score for the at least one in the document field;
adding together the first number of occurrences for the at least one word; and
dividing the added first number of occurrences for the at least one word by the sum of the first number of occurrences and the second number of occurrences.

25. A system, comprising:
a processor-implemented query interpreter module configured to:
  parse a search query received from a user to identify keywords;
  identify at least one dominant category using the keywords, the at least one dominant category including documents containing the keywords; and
  determine an intent of the search query using the keywords, the intent related to a class of documents to be returned from two binary classifications of documents; and
a processor-implemented ranking module configured to:
  group the documents in the at least one dominant category into the two binary classifications, the grouping based on a score calculated for each document in the at least one dominant category, the score representing a probability that the document belongs in one of the two binary classifications;
  provide a subset of the documents to the user, the subset of the documents being the documents grouped in one of the two binary classifications, the one of the binary classifications identified based on the intent of the search query; and
  order the subset of the documents according to at least one of the document scores and a document attribute.

* * * * *